United States Patent [19]
Hargreaves et al.

[11] Patent Number: 5,673,040
[45] Date of Patent: Sep. 30, 1997

[54] ERGONOMIC KEYBOARD APPARATUS

[75] Inventors: William R. Hargreaves, Bellevue; Shirley A. Lunde; William P. Farrand, both of Seattle, all of Wash.

[73] Assignee: Kinesis Corporation, Bothell, Wash.

[21] Appl. No.: 128,325

[22] Filed: Jun. 2, 1993

Related U.S. Application Data

[63] Continuation of Ser. No. 683,980, Apr. 10, 1991, abandoned.
[51] Int. Cl.$^6$ .................................................. H03K 17/94
[52] U.S. Cl. ........................... 341/22; 400/488; 400/489; D14/115
[58] Field of Search ......................... 341/22, 27, 29; 400/486, 488, 489, 482–484; 434/227, 231; D14/100, 114, 115; D17/1, 2, 9; D18/1, 7, 12

[56] References Cited

U.S. PATENT DOCUMENTS

| | | | |
|---|---|---|---|
| D. 287,854 | 1/1987 | Crews | D14/100 |
| D. 340,445 | 10/1993 | Marquardt et al. | D14/115 |
| 1,395,049 | 10/1921 | McNamara . | |

(List continued on next page.)

FOREIGN PATENT DOCUMENTS

| | | | |
|---|---|---|---|
| 1279693 | 9/1963 | Germany | 400/486 |
| 1016993 | 1/1966 | United Kingdom . | |
| 2000083 | 1/1979 | United Kingdom . | |
| 2181096 | 4/1987 | United Kingdom . | |
| US89/00134 | 7/1989 | WIPO | 341/22 |

OTHER PUBLICATIONS

*Cumulative Trauma Disorders in Claims Initiation, Baseline Findings*, by Safety & Health Assessment and Research Program, Wash. DL&I; Jan. 7, 1991; pp. 1–13 and 3 sheets of drawings.

*Ergonomic Principles in Office Automation*, Chapter on *Keyboard Design* by Harry Snyder; published by Ericsson Information Systems, Sweden; 1983; pp. 43–57.
*Carpal tunnel syndrome*, by Sally James; Issues of Injury, vol. I, No. 1, published by Medical Consultants Northwest Inc., May 1987; pp. 1–6.
*Keyboard design through physiological strain measurements*, by P. Zipp, E. Haider, N. Halpern, and W. Rohmert; Applied Ergonomics, Jun. 1983; pp. 117–122.
*Human Engineering the Keyboard*, by K.H. Eberhard Kroemer; Human Factors, 1972, 14(1); pp. 51–63.
*Occupational Carpal Tunnel Syndrome in Washington State, 1984–1988*, by G.M. Franklin, MD, MPH, J. Haug, MSc, N. Heyer, PhD, H. Checkoway, PhD, and N. Peck, MPA; American Journal of Public Health, Jun. 1991, vol. 81, No. 6; pp. 741–746.

(List continued on next page.)

Primary Examiner—John K. Peng
Assistant Examiner—Andrew Hill
Attorney, Agent, or Firm—Bogle & Gates PLLC

[57] ABSTRACT

A keyboard for use with a standard personal computer includes an alphanumeric key array having a plurality of alphanumeric keys arranged in a generally orthogonal, concave array. A home row of keys defines a reference position for the fingers of the operator. A linear array of function keys is provided and positioned above the reference position and tilted toward the operator. A generally orthogonal array of auxiliary keys is also positioned above the reference position. The array of auxiliary keys is rotated with respect to the reference position to accommodate the natural angle of the thumb of the operator to the index finger. A palm rest is provided for receiving the palm of the operator while the operator is manipulating the plurality of alphanumeric keys. The palm rest is positioned above the reference position defined by the home row so that during operation of the alphanumeric keys, the fingers of the operator extend downward from the palm rest in a natural curved manner. Further, during operation of the auxiliary keys, the thumbs of the operator are generally coplanar with the palm of the operator and are naturally angled therefrom.

38 Claims, 2 Drawing Sheets

U.S. PATENT DOCUMENTS

| | | | |
|---|---|---|---|
| 1,652,464 | 2/1927 | Tyberg . | |
| 2,040,248 | 5/1936 | Dvorak et al. . | |
| 3,022,878 | 2/1962 | Seibel et al. | 197/19 |
| 3,805,939 | 4/1974 | Ross | 197/19 |
| 3,911,234 | 10/1975 | Kotaka . | |
| 3,929,216 | 12/1975 | Einbinder | 400/488 |
| 3,940,758 | 2/1976 | Margolin . | |
| 3,945,482 | 3/1976 | Einbinder | 197/100 |
| 3,990,565 | 11/1976 | Felton . | |
| 4,081,068 | 3/1978 | Zapp | D18/1 |
| 4,244,659 | 1/1981 | Malt | 400/489 |
| 4,378,553 | 3/1983 | McCall | 340/365 |
| 4,440,515 | 4/1984 | Nassimbene | 400/479 |
| 4,467,321 | 8/1984 | Volnak | 340/365 |
| 4,509,873 | 4/1985 | Ryan | 400/489 |
| 4,522,518 | 6/1985 | Schmidt | 400/486 |
| 4,579,470 | 4/1986 | Casey | 400/489 |
| 4,597,681 | 7/1986 | Hodges | 400/488 |
| 4,613,247 | 9/1986 | McGunnigle | 400/486 |
| 4,615,629 | 10/1986 | Power | 400/486 |
| 4,655,621 | 4/1987 | Holden | 400/100 |
| 4,679,030 | 7/1987 | Volnak | 340/365 |
| 4,680,572 | 7/1987 | Meguire et al. | 340/365 |
| 4,686,408 | 8/1987 | Ishiyama . | |
| 4,715,736 | 12/1987 | McGunnigle | 400/484 |
| 4,735,520 | 4/1988 | Suzuki et al. | 400/488 |
| 4,791,526 | 12/1988 | Breu et al. . | |
| 4,824,268 | 4/1989 | Diernisse | 400/486 |
| 4,833,446 | 5/1989 | Eilam et al. | 341/22 |
| 4,836,700 | 6/1989 | Jensen | 400/489 |
| 4,897,649 | 1/1990 | Stucki | 341/22 |
| 4,913,573 | 4/1990 | Retter | 400/489 |
| 4,917,516 | 4/1990 | Retter | 400/489 |
| 4,949,080 | 8/1990 | Mikan | 340/711 |
| 4,974,183 | 11/1990 | Miller | 400/488 |
| 5,017,030 | 5/1991 | Crews | 400/489 |
| 5,091,771 | 2/1992 | Bolan et al. . | |
| 5,122,786 | 6/1992 | Rader | 340/711 |
| 5,126,723 | 6/1992 | Long et al. | 340/710 |
| 5,156,475 | 10/1992 | Zilberman | 400/472 |
| 5,160,919 | 11/1992 | Mohler et al. | 340/711 |
| 5,164,712 | 11/1992 | Niitsuma | 340/706 |
| 5,269,004 | 12/1993 | Comerford et al. | 395/275 |
| 5,270,690 | 12/1993 | Oberg | 345/163 |

OTHER PUBLICATIONS

*Analysis of the Tony!™ Variable Geometry VDT Keyboard*, by D.A. Thompson, J. Thomas, J. Cone, A. Daponte, and R. Markison; Proceedings of the Human Factors Society 34th Annual Meeting, 1990; pp. 365–369.

*Upper Limb Ergonomic Stressors in Selected Newspaper Jobs, A Pilot Study*, by University of Michigan and National Institute for Occupational Safety & Health, May 21, 1990; pp. 1–43.

*Unversity of Washington Study of Video Display Terminal Workers*, by N. Heyer, H. Checkoway, Wm. Daniell, S. Horstman, J. Camp; Feb. 1989; Appendices D, E & F.

"Technical Reference," Sec. 1, 4, & 5, *IBM Personal Computer Hardware Reference Library*, Sep. 1975.

"Contoured Keyboard" IBM Technical Disclosure Bulletin, vol. 22, No. 3, Aug. 1979, pp. 1276–1277.

"Safeskin" product advertisement, from *PC Magazine*, Feb. 28, 1989, vol. 8, No. 4, p. 86.

"PC Brand" computer advertisement, from *PC Magazine*, Jan. 31, 1989, vol. 8, No. 2, p. 178.

"TDA Template" advertisement, from *Personal Computing*, Dec. 1989, vol. 13, No. 2, pp. 236–237.

IBM Technical Disclosure Bulletin, vol. 25, No. 7A, Dec., 1982.

ERGONOMIC KEYBOARD APPARATUS

This is a continuation Ser. No. 07/683,980, filed Apr. 10, 1991, now abandoned.

FIELD OF THE INVENTION

The present invention relates generally to keyboards used for data input in conjunction with typewriters, computers and other like devices and, more particularly, an ergonomic keyboard for use with modern computers.

BACKGROUND OF THE INVENTION

The conventional typewriter and computer keyboard, hereinafter called the conventional qwerty keyboard, consists in diagrammatic representation of four horizontal rows of alphanumeric keys. The keys on one row are offset with respect to the keys on adjacent rows so that diagonal columns are formed.

The qwerty keyboard has long been recognized to have many disadvantages, including the following: the most commonly used letters are on the top row rather than on the home (middle) row, where the fingers normally rest; many of the most frequent stroking actions must be done by the weakest fingers (the little fingers); the left hand executes more strokes, both in terms of number and complexity, than the right hand, even though the majority of users are right-handed; the little finger of the right hand must select from at least 15 keys on the modern computer keyboard (IBM-AT compatible enhanced 101 keyboard), some of which are seldom used and thus require visual selection even by most touch typists; more complex stroking movements are required by the staggered key arrangement than would be required were the keys arranged in vertical columns. Furthermore, large numbers of "function" and "control" keys have evolved for use with modern computer software. Such function and control keys are often used in combination with other keys, further increasing the difficulty in comfortably and accurately typing all the keys on a modern computer keyboard.

These disadvantages affect typing speed, accuracy and endurance and may also have a number of acute and chronic health problems for individuals who use such keyboards intensively or over long periods of time. The health problems caused by excessive keyboard use are collectively called repetitive strain injuries. In combination with simple repetition of forceful motion, major factors which are believed to lead to health problems include pronation of the wrist, extension of the wrist, and ulnar deviation, among others. These injurious factors are caused or exaggerated by the use of traditional qwerty keyboards.

Many prior art keyboard arrangements have been proposed to eliminate the inadequacies of the qwerty keyboard. These prior art keyboard arrangements generally fall into three groups, referred to herein as the "letter layout alternatives" group, the "geometric alternatives" group, and the "hybrid alternatives" group. However, as discussed in more detail below, these prior art keyboard arrangements have suffered from incomplete solutions and/or excessive training requirements. As a result, none of the prior art keyboard arrangements have gained widespread acceptance.

The letter layout alternatives group consists of keyboards in which the standard alphanumeric key set is employed, but the order of the keys has been varied while retaining the standard keyboard geometry. An example of a keyboard that falls into this group is provided in U.S. Pat. No. 2,040,248, issued to Dvorak on May 12, 1936. The Dvorak patent describes a keyboard in which the layout of the alphanumeric keys is based on incidence of usage. Dvorak attempted to position the most heavily used keys (e.g. "E") in the home row, and to minimize awkward letter combinations and long reaches. However, the keyboard of the Dvorak patent, as well as other keyboards falling into the letter layout alternatives group, suffers from the disadvantage that significant relearning is required before it can be used by a skilled touch typist accustomed to a qwerty keyboard.

The geometric alternatives group consists of keyboards in which both the standard alphanumeric key set and key layout are employed, but the geometry of the keyboard has been varied. As an example, U.S. Pat. No. 1,652,464, issued Dec. 13, 1927 to Tyberg, describes a planar qwerty keyboard which is split into right and left and segments. The right and left hand segments are separated from one another and linked in a fixed position to a central segment containing function keys. As another example, U.S. Pat. No. 4,244,659, issued Jan. 13, 1981, to Malt describes a keyboard employing concave wells for right and left hand segments. The right and left hand segments of the keyboard described by Tyberg and Malt maintain the layout of the qwerty keyboard so that significant relearning of the keyboard is not required.

However, the keyboards described by Tyberg and Malt, as well as others falling into the geometric alternatives group, do not address the problems of extensive work and excessive key selection that is required by modern keyboards having function and auxiliary keys. Therefore, although providing a keyboard that reduces pronation of the wrist and ulnar deviation, prior art keyboards falling into the geometric alternatives group are not acceptable for use with modern keyboards having multiple function and auxiliary keys.

The hybrid alternatives group consists of keyboards in which the alphanumeric key set and the key layout, as well as the keyboard geometry have been varied. This third group includes the "chordic" alternatives, in which key combinations or "chords" are used to enter additional letters or numbers which are not represented by single keys. An example of keyboards falling into this group is U.S. Pat. No. 4,897,649, issued to Stucki on Jan. 30, 1990. The Stucki patent describes a keyboard in which multiple sets of two or more keys are mounted on a common base and arranged such as to be comprehended and operated by a single finger. The base is configured to provide separate areas for the right and left hands and an integral rest for the heels of the hands. The keyboard described by the Stucki patent is typical of keyboards falling into the hybrid alternatives group which suffer from the same relearning disadvantages as keyboards falling into the alternative layout group. Additionally, since some of the keyboards of the hybrid alternatives group provide for improved manipulation of the function and auxiliary keys found on modern keyboards, the difficulty in relearning these keyboards is increased, thereby further decreasing their acceptability as an alternative to the qwerty keyboard.

Accordingly, there remains a need in the art for a keyboard that minimizes the strain and effort associated with undesirable postures and motions of the hands, wrists and arms. Further, it is desirable to provide such a keyboard that simultaneously reduces typing inaccuracies and minimizes the need for relearning. Still further, it is desirable to provide a keyboard that minimizes strain and effort of use resulting from the increased usage of specialized function keys on modern keyboards.

SUMMARY OF THE INVENTION

The present invention provides an improved keyboard for interacting with a data processing device. The keyboard includes an alphanumeric key array having a home row of keys constructed for providing a reference position for the fingers of the operator. The keyboard also includes a function key array that is elevated above the reference position defined by the home row of keys and tilted toward the operator.

In an alternative embodiment of the invention, the keyboard includes an alphanumeric key array having a home row of keys constructed for providing a reference position for the fingers of the operator. The keyboard also includes an auxiliary array of keys that are elevated with respect to the home row of keys and angled thereto for manipulation by the thumbs of the operator.

Still further, the auxiliary array of keys may include at least first and second keys positioned on the surface of the keyboard and generally along a line defined by the positioning of the thumb of the operator when in the reference position. The first and second keys are constructed to move normal to the keyboard between first and second positions. The first key is elevated with respect to the second key so that the surface of the first key is above the surface of the second key in any position combination.

DETAILED DESCRIPTION OF THE PREFERRED EMBODIMENT

Figure 1:
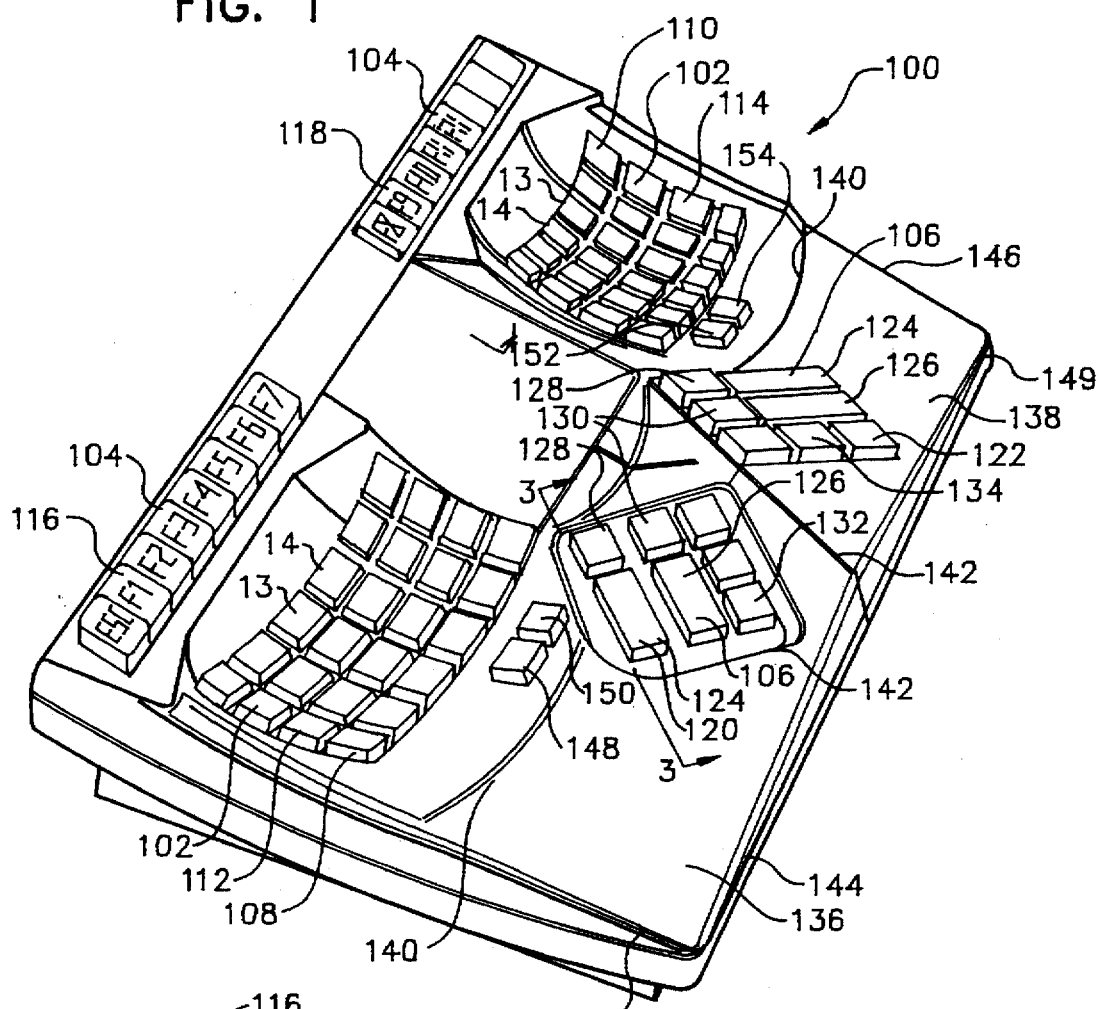
FIG. 1 is a perspective view of the ergonomic keyboard of the present invention.

An improved ergonomic keyboard 100 for use with a modern computer (not shown), such as a standard personal computer, includes a plurality of alphanumeric keys 102, a plurality of function keys 104, and a plurality of auxiliary keys 106. It will be apparent to those skilled in the an that although the invention is described herein by reference to a keyboard 100 for use with a standard computer (not shown), the keyboard of the present invention could be used for data entry in combination with any data processing apparatus. As examples, the keyboard of the present invention could be used in combination with: control panel such as those found in aircraft, automobiles, and military apparatus; video games; electronic musical instruments; nonstandard keyboards; etc.

The alphanumeric keys 102 include all the ascii-character-generating keys of the standard four rows on a conventional typewriter keyboard, arranged in an array having the standard qwerty layout. As is known in the art, the alphanumeric keys 102 are provided for identifying and entering alphabet characters to the standard computer (not shown) with which the keyboard 100 is used.

In the presently preferred embodiment of the invention the alphanumeric keys 102 are separated into first and second arrays 108 and 110 positioned for manipulation by the left and right hands of the operator, respectively. The first and second arrays are each arranged in an approximately orthogonal, concave array. However, the key columns for the ring finger 13 middle finger 14 are generally more distal from the operator than the other columns. This offset is typically ¼ to ⅔ of a keycap width.

The first and second arrays 108 and 110 include first and second home rows 112 and 114, respectively, of home keys that define a reference position for the fingers of the operator. Although the alphanumeric keys 102 are described herein as arranged in first and second concave arrays, it will be apparent to those skilled in the art that aspects of the present invention may be readily adapted for use with a keyboard wherein the keys are positioned in the standard qwerty arrangement.

The plurality of function keys 104 are typically provided for activating special functions rather than generating printable characters and are commonly used in combination with the auxiliary keys 106 or with the alphanumeric keys 102. As is known in the art, the plurality of function keys 104 are labeled at least F1 through F10, and typically F1 through F12 or more, and include escape (Esc), Print Screen (Print Scrn F13), Scroll Lock (F14), and Pause (F15). Different hardware systems (i.e., Apple Macintosh vs IBM PC or clone) and different applications software utilize different combinations of function keys, alphanumeric keys, and auxiliary keys.

The plurality of function keys 104 are arranged in first and second arrays 116 and 118 for manipulation by the left and right hands of the operator, respectively, wherein each array includes a plurality of keys. The keys of the first and second arrays 116 and 118 are each arranged in a linear fashion generally parallel to the reference position defined by the first and second home rows 112 and 114, respectively. The keys of the first and second arrays 116 and 118 are spaced closer (e.g., ⅝ inch center to center) than the standard distance (¾ inch) for alphanumeric keys. It may be desirable in some applications, however, to arrange the keys of the first and second arrays 116 and 118 in an arc about the first and second arrays 108 and 110, respectively. Also, as discussed above with respect to the first and second arrays 108 and 110, the first and second arrays 116 and 118 may be arranged for use with a keyboard having a standard qwerty arrangement.

Figure 2:
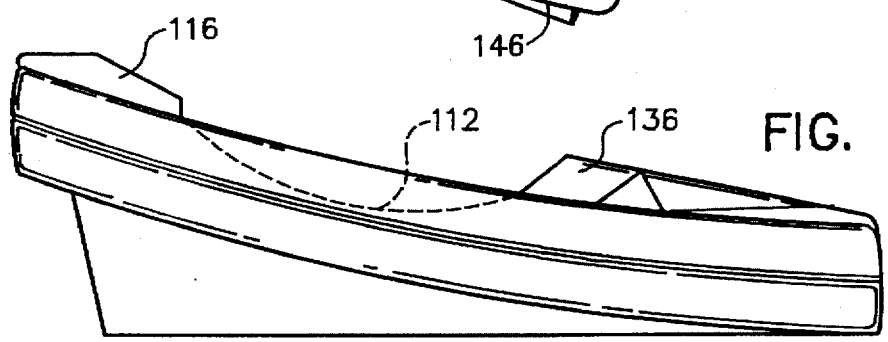
FIG. 2 is a side view of the ergonomic keyboard illustrated in FIG. 1.

To improve the comfort and speed with which the function keys 104 may be used by the operator, the first and second arrays 116 and 118 are elevated above the level of the reference position defined by the first and second home rows 112 and 114 and are tired toward the user. As also illustrated in FIG. 2, the degree of elevation and flit relative to the first and second home rows 112 and 114 is preferably 3–5 cm and 15–35 degrees, respectively. It will be apparent, however, that the foregoing values for preferred degrees of elevation and tilt are provided as illustrative examples and that some variation may be provided without departing from the true scope of the present invention.

The auxiliary keys 106 include a plurality of keys that are commonly employed with the conventional typewriter and/ or computer key layout and that perform a function other than to enter an alphanumeric character. Examples of the functions performed by the auxiliary keys 106 include Space, Enter, Shift, Caps lock, Tab, Backspace, Control, and Alt. The Apple MacIntosh computer also uses the command (Cmd) key.

The auxiliary keys 106 are separated into first and second arrays 120 and 122 for manipulation by the left and fight hands of the operator, respectively. It will be apparent to those skilled in the art that it may be desirable to provide keys in both the first and second arrays 120 and 122 for performing the same function, e.g., Space. The keys of the first and second arrays 120 and 122 are elevated with respect to the reference position defined by the first and second home rows 112 and 114. Preferably the first and second arrays 120 and 122 are nearly level relative to the supporting desk surface, or slopes slightly up away from the operator (typically deviating less than 10 degrees from level).

The keys of the first and second arrays 120 and 122 are arranged in a generally orthogonal relationship the axes of which are rotated with respect to the reference position. Preferably the angle that the keys of the first and second arrays 120 and 122 are rotated with respect to the reference position is approximately 20–30 degrees, and preferably approximately 25 degrees from straight ahead relative to the operator. This rotation is critical in fitting the of thumb of most users comfortably along the length of long keycaps (space, enter, backspace), and surprisingly accommodates operators with very small hands such as children (as young as approximately 7 years old) as well as adult operators with very large hands.

The first and second arrays 120 and 122 each include first and second elongated keys 124 and 126 which are positioned so that the thumbs of the operator are substantially parallel to their linear axis when the operator's hands are in the reference position- The positioning of the first and second elongated keys 124 and 126 make it easy to type quickly and frequently. The first elongated key 124 is typically assigned the Space auxiliary key on both the first and second arrays 120 and 122, as discussed above. However, the second elongated key 126 is typically assigned the Backspace auxiliary key for the second array 122 and the Enter auxiliary key for the first array 120. For use with both IBM-AT style keyboards and Apple Computer Corporation Macintosh style computers, three auxiliary keys (Ctrl 28, Alt 30, and Cmd 32) are positioned in the thumb pad. These auxiliary keys are conveniently depressed with the thumb for use in combination with an alphanumeric key, another auxiliary key, or with a function key.

The first and second array 120 and 122 also include first and second standard keys 128 and 130 associated with and positioned along the linear axis of the first and second elongated keys 124 and 126, respectively. Each of the keys 124–130 is constructed to move between first and second positions generally normal to the surface of the keyboard 100.

Figure 3:
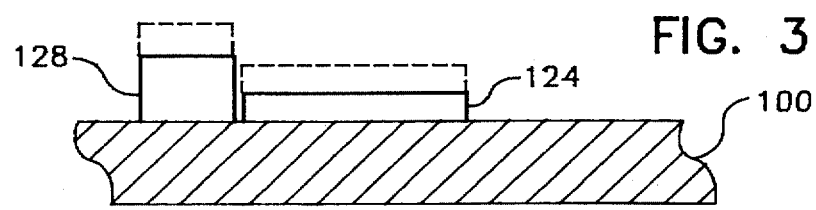
FIG. 3 is a partial sectional view taken along lines 3—3 of FIG. 1.

With reference to FIG. 3, the first elongated key 124 is shown to move between an open position (shown in outline) and a second actuated position. Similarly, the first standard key 128 is shown to move between an open position (shown in outline) and an actuated position. The first standard key 128 is positioned with its surface above the surface of the first elongated key 124 so that when the first elongated key 124 is in the open position (shown in outline), the first standard key may be depressed to the actuated position and its surface remain above the surface of the first elongated key. Positioned in this manner, the first and second standard keys 128 and 130 may be easily manipulated by the thumb of the operator without inadvertent activation of the first and second elongated keys 124 and 126.

Further, it may be desirable in some applications to position the surface of the second elongated key 126 above that of the first elongated key 124 so that the operator may easily determine the mount of movement necessary by the thumb to move from the first elongated key 124 to the second elongated key 126. The same may be true for subsequent linear rows of keys in the first and second arrays 120 and 122 such the keys in the linear rows 132 and 134, respectively.

An important aspect of achieving comfortable fit of both small and large hands is the inclusion of first and second integral palm rests 136 and 138 for receiving the heel of the operators left and right hands, respectively. The first and second integral palm rests 136 and 138 can be fitted with an adhesive or clip-on pad for optimal comfort and for preventing large hands from sliding off. Users with small hands are able to rest their palm on the integral support, while users with very large hands are still able to comfortably support their palms while either typing or resting.

The first and second integral palm rests 136 and 138 are each elevated from the reference position defined by the first and second home rows 112 and 114, respectively. Further, the first and second integral palm rests 136 and 138 slope downwardly from edges 140 and 142 to second and third edges 144 and 146, respectively. The sloping of the first and second integral palm rests enables the operator's hand to be supported at an angle that varies moderately from full pronation, e.g., 10–30 degrees. It will be apparent to those skilled in the art that the palm rests are positioned to be in contact with the palms of the user while the user is manipulating the keys of the first arrays 108, 116, and 120, and the second arrays 110, 118, and 122. Further, the keys of the first and second arrays 108 and 110 are positioned below the first and second palm rests so that the fingers of the operator may naturally bend downward from the first and second integral palm rests 136 and 138 while manipulating the keys. The first and second arrays 120 and 122 are positioned above the first and second arrays 108 and 110 and rotated from the reference position so that the thumbs may be in their natural position substantially coplanar with the palm and can move naturally away from the palm to manipulate the keys of the first and second arrays 120 and 122.

The present invention combines proven features of alternative keyboards (split left and right alphanumeric segments, concave alphanumeric key layout geometry, integral palm rests), with novel features that provide surprisingly improved performance. This combination of design features minimizes the persistent, previously unsolved problems of conventional qwerty keyboards, without changing the familiar qwerty alphanumeric key layout. These improvements are accomplished by:

1. Reducing the strain and slow typing associated with using the computer function keys, which typically number at least 16, by elevating the function key row and tilting the keys towards the user relative to the plane of the alphanumeric keys. This positions the function keys closer to the home row and more visible to the operator. For split keyboards, using split function keys with reduced center-to-center spacing (preferably ⅝ inch) allows the use of at least 8 easily typed function keys above each alphanumeric segment. Using short travel calculator-type switches for the function keys further facilitates convenient typing and allows for a more compact design than full travel switches.

Figure 4:
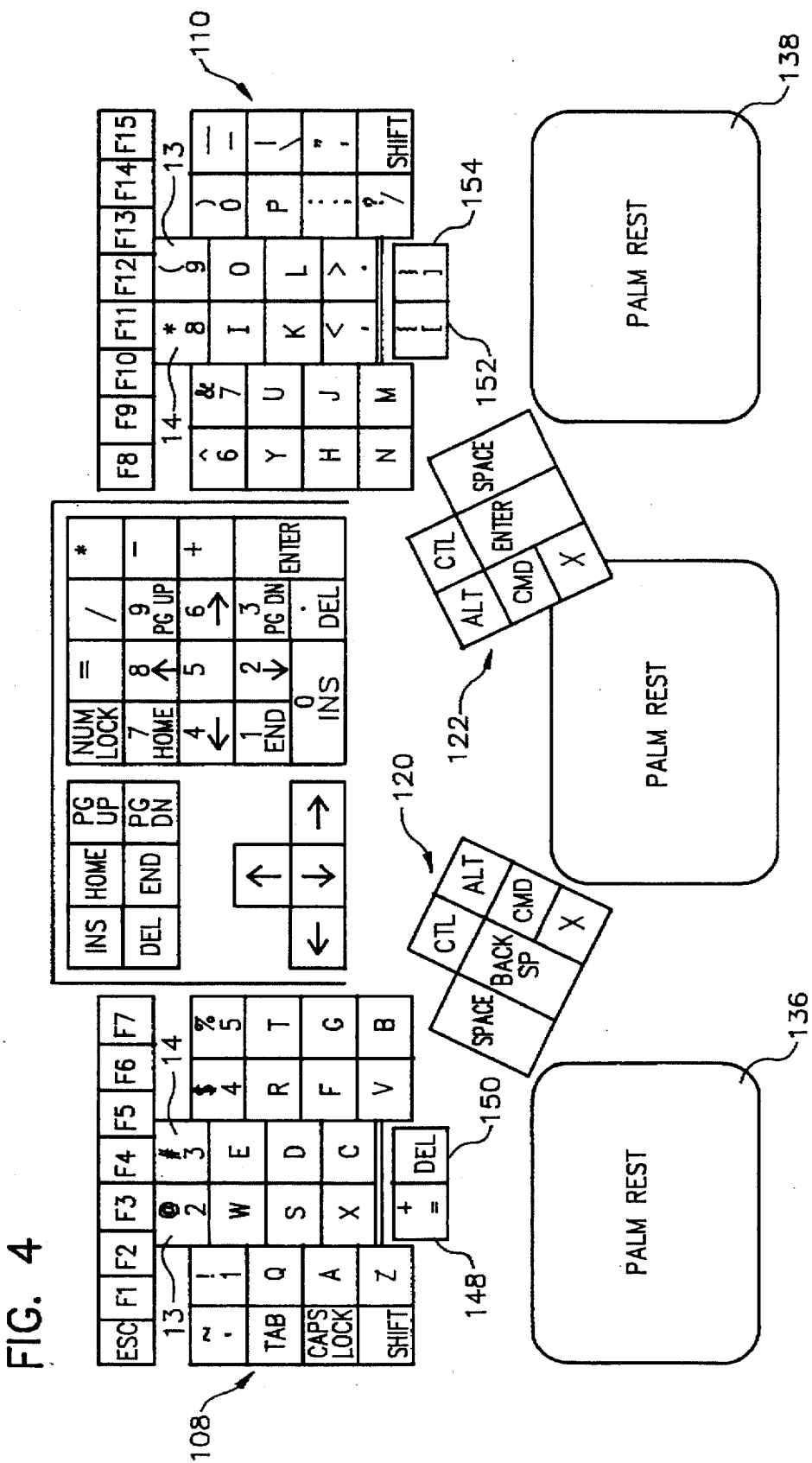
FIG. 4 is a plan view of the keyboard illustrated in FIG. 1 showing the layout of the keys thereof.

2. Reducing the strain as well as inaccuracy and/or visual typing required by the number of keys (typically at least 15) addressed by the weak right little finger on a typical computer keyboard. This is achieved by reducing little finger keys to 8, by moving to the thumb position the most commonly-used keys (Enter/Return, Backspace, Ctrl, Alt, Cmd). As an example, a plurality of new key positions 148–154 have been added to the first and second arrays 108 and 110. As best illustrated in FIG. 4: new key position 148 identifies the addition ("+") and equal ("=") signs; new key position 150 identifies the delete function; new key position 152 identifies the left special bracket ("{" and "[") symbols; and new key position 154 identifies the right special bracket ("}" and "]") symbols.

3. Reducing the strain and slow typing associated with using the special "control keys", typically pressed in combination with letter keys or with function keys. This is achieved by moving the control keys from proximal-lateral to proximal-medial positions. This change is especially advantageous when combined with the change in position and attitude of the function keys.

4. Reducing the strain and stretching required in using the standard qwerty alphanumeric key layout by creating a concave well in which the alphanumeric keys are arrayed. The keys are placed in a generally orthogonal array of rows and columns to minimize awkward and tedious side-reaching with the fingers. However, certain adjacent columns are offset by ¼ to ⅔ (preferably approximately ½) keycap width to better fit the lengths of human fingers. This combination of features, in conjunction with the other features described above, provides the surprising advantage that the typical operator may type the entire alphanumeric key set with hands resting on the palm/wrist support, thus reducing repetitive wrist motions and fatigue. When this concave, orthogonal array is used with conventional keycaps sloping at different angles in different rows (originally designed for use with conventional "flat" qwerty keyboards), the ease and accuracy of typing is further enhanced.

Undesirable postures and motions of the hands, wrists, and arms are minimized or eliminated for most operators, including pronation of the wrist, extension of the wrists, and ulnar deviation. Surprisingly, this significant improvement in comfort, accuracy, and endurance is achieved in the best mode of the present invention without requiring the operator to relearn the relative positions of alphanumeric keys. Only minimal learning is required for efficient use of the medially-transferred auxiliary and control keys, and to compensate for the small positional differences of the alphanumeric keys caused by the change from diagonal to orthogonal key layout. While the primary objective of the present invention is improved comfort and endurance, plus reduced strain and stretching, without requiring substantial relearning, a further benefit is increased performance through increased accuracy and decreased visual typing of previously hard-to-reach keys.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A keyboard for interfacing the fingers of an operator's hand with a data processing device comprising:

first and second laterally spaced apart alphanumeric key arrays having a plurality of alphanumeric key means for identifying alphanumeric characters to the data processing device by a non-pivoting, linear movement in a direction of actuation, said key means including a home row having home keys wherein the home keys have keycaps oriented to be manipulated by the fingers of the operator, said home key keycaps defining a reference surface substantially perpendicular to the direction of actuation of said home keys, said alphanumeric key array having a first end and a second opposed end positioned on opposite sides of said reference surface wherein said first end is closer to the operator when the keyboard is being used than the second end a hand of the operator defining a reference position when the fingers of said hand of the operator are adjacent the reference surface; and first and second laterally spaced apart function key arrays each having a plurality of function key means for identifying functions to be performed by the data processing device, said first and second laterally spaced apart function key arrays being substantially aligned, respectively, with said first and second spaced apart alphanumeric key arrays, said plurality of function key means being farther from said operator than said second end of the alphanumeric key array, said function keys having function key keycaps for manipulation by the fingers of the operator, vertically displaced above said reference surface, said plurality of function key means accessible to the fingers of the operator without moving the hand of the operator a substantial distance from the reference position.

2. The keyboard as recited in claim 1 wherein said alphanumeric key means include a plurality of keys arranged in a generally orthogonal, substantially concave array.

3. The keyboard as recited in claim 1, further including palm rest means for receiving the palm of said hand of the operator, said palm rest means being vertically displaced above said reference surface defined by said keycaps so that the fingers of the operator extend downward from said palm rest means during operation of the keyboard.

4. The keyboard as recited in claim 1, further comprising an auxiliary key array including a plurality of auxiliary key means for identifying auxiliary key means performed by the data processing device, said auxiliary key means including a plurality of auxiliary keys arranged in a generally orthogonal array, said auxiliary key means being vertically displaced above said reference surface defined by said keycaps and positioned to be operated by the thumb of said hand of the user so that during operation the fingers extend downward from the thumb.

5. The keyboard as recited in claim 4 where said plurality of auxiliary keys include first and second keys positioned to be linearly aligned along the thumb of the operator so that the thumb of the operator can simultaneously contact both of said first and second keys when the operator's hand is in the reference position, said first and second keys being constructed to move between first remote and second proximate positions remote from and proximate to the keyboard, respectively, said first key being positioned so that its thumb-contacting surface is vertically displaced above the thumb-contacting surface of said second key when said first key is in said second proximate position and said second key is in said first remote position while the thumb of the operator is contacting both of said first and second keys, in the absence of inadvertent activation of said second key.

6. The keyboard as recited in claim 4, wherein said alphanumeric key array comprises first and second alphanumeric key arrays separated for manipulation by the left and right hands of the operator, respectively, said function key array comprising first and second function key arrays separated for manipulation by the left and right hands of the user, respectively, and wherein said auxiliary key array comprises first and second auxiliary key arrays separated for manipulation by the left and right hands of the user, respectively.

7. A keyboard, as claimed in claim 1, wherein all of said function key keycaps are aligned in a substantially linear row.

8. A keyboard as claimed in claim 1, wherein all of said function key keycaps are oriented at substantially the same angle, different from the orientation of the home key keycaps, and angled toward the operator at an angle of between about 15° and about 35° with respect to said reference surface.

9. A keyboard as claimed in claim 1, wherein said function key means are spaced closer together than said alphanumeric key means.

10. Data input apparatus for interfacing the fingers of the hand of an operator with a data processing device comprising:

first and second key arrays having a plurality of key means constructed for manipulation by the fingers of the operator for providing input to the data processing device, said plurality of key means including home keys having surfaces that define a reference surface, said home keys further defining a reference position for a hand of the operator wherein the index finger of the operator defines a reference line when said hand of the operator is positioned in the reference position;

first and second auxiliary key arrays including a plurality of auxiliary key means constructed for manipulation by the thumb of said hand of the operator for providing input to the data processing device by depressing said auxiliary key means and with no substantial lateral movement of said auxiliary key means, said auxiliary key means being vertically displaced from the reference surface defined by said home keys and positioned so that the fingers of the operator extend downward from the thumb when said hand of the operator is in the reference position, each of said first and second auxiliary key arrays including first and second elongated keys positioned at an angle with respect to the reference line so that the thumb of the operator may be positioned along the surface of said elongated keys; and palm rest means for receiving the palm of the operator.

11. The data input apparatus as recited in claim 10, said palm rest means being vertically displaced from the reference position defined by said home keys so that the fingers of the operator extend downward from said palm rest means during operation of the data input apparatus, said auxiliary key means being positioned so that the thumb of said hand of the operator is generally coplanar with the palm of said hand of the operator during operation.

12. The data input apparatus as recited in claim 10, wherein said plurality of auxiliary keys include first and second keys positioned to be linearly aligned along the thumb of the operator when the operator's hand is in the reference position, said first and second keys being constructed to move between first remote and second proximate positions remote from and proximate to the data input apparatus, respectively, said first key being positioned so that its surface is vertically displaced from the surface of said second key when said first key is in said second proximate position and said second key is in said first remote position.

13. The data input apparatus as recited in claim 10, wherein said key means includes a plurality of keys arranged in a generally orthogonal, substantially concave array.

14. The data input apparatus as recited in claim 10, further comprising a function key array having a plurality of function key means for identifying functions to be performed by the data processing device, said first key array having a first end and a second opposed end positioned on opposite sides of said reference surface wherein said first end is closer to the operator when the keyboard is being used, said plurality of function key means being farther from said operator than said second end of the first key array, vertically displaced from said reference surface and angled toward a hand of the operator thereby making said plurality of function key means accessible to the fingers of the operator without moving the hand of the operator a substantial distance from the reference position.

15. The data input apparatus as recited in claim 14 wherein said key array comprises an alphanumeric key array.

16. The data input apparatus as recited in claim 15 wherein said alphanumeric key array comprises first and second alphanumeric key arrays separated for manipulation by the left and right hands of the operator, respectively, said function key array comprising first and second function key arrays separated for manipulation by the left and right hands of the user, respectively, and wherein said auxiliary key array comprises first and second auxiliary key arrays separated for manipulation by the left and right hands of the user, respectively.

17. A data input apparatus as claimed in claim 10, wherein said angle with respect to the reference line is between about 20° and about 30°.

18. Data input apparatus, as claimed in claim 10, wherein said elongated key is positioned at an angle of between about 20° and about 30° with respect to the reference line.

19. Data input apparatus, as claimed in claim 10, wherein said data input apparatus has a lower surface for support on a support surface and wherein said auxiliary key array is sloped downward, with respect to said support surface, at no more than about 10° in a direction toward the operator.

20. A data input device, as claimed in claim 10, wherein said data input apparatus has an operator end and a distal end with the operator end being proximate the operator when the keyboard is being used, said key array and said auxiliary key array comprising an alphanumeric keyboard array also having an operator end and a distal end;

said input apparatus having a left edge and a right edge each extending between said input apparatus distal end and said input apparatus operator end;

said input apparatus having a midline about midway between said left edge and said right edge and wherein said palm rest means includes left and right palm rests said left palm rest configured to support a user's hand at an angel which slopes vertically downward in first and second directions, the first direction being from said second end of said alphanumeric keyboard array toward said operator end of said input device, the second direction being from said midline toward said left edge; and said right palm rest configured to support a user's hand at an angle which slopes vertically downward in said first direction and a third direction different from said second direction, said third direction being from said midline toward said right edge.

21. A keyboard, as claimed in claim 7, wherein said palm rests are configured to be substantially in contact with the palms of the user while the user is manipulating the keys.

22. A keyboard, as claimed in claim 7, wherein said palm rests are configured to accommodate clip-on pads.

23. A keyboard, as claimed in claim 7, wherein said palm rests are configured to accommodate self-adhesive pads.

24. A data input device, as claimed in claim 10, wherein said data input apparatus has a first end and a second end with the first end being closer to the operator when the keyboard is being used, said first key array also having a first end and a second end;

said first key array having a medial edge and a lateral edge each extending between said first key array second end and said first key array first end; and a palm rest configured to support the palm of said hand of said operator at an angle which slopes vertically downward in first and second directions, the first direction being from said second end of said first key array toward said first end of said input device, the second direction being from said medial edge toward said lateral edge.

25. A data input apparatus, as claimed in claim 12, wherein said plurality of auxiliary keys includes a third key constructed to move between remote and proximate positions and positioned so that when said first, second and third keys are in said remote positions, the keycap surface of said third key is vertically displaced from both said first key and said second key and the keycap surface of said first key is vertically displaced from said second key.

26. A data input apparatus and claimed in claim 10, wherein said palm rest means positions the palm of the operator generally coplanar with the auxiliary key means during use of the keyboard by the operator.

27. A data input apparatus as claimed in claim 10, wherein said first and second elongated keys are positioned so that they are substantially parallel with the axis of the thumb during use of the keyboard when the hand of the operator is in the reference position.

28. A data input device for interfacing the hands of an operator with a data processing device comprising:

first and second pall rests configured to support the palms of the operator; and first and second key arrays each including at least two elongated keys positioned to be aligned along the thumb of the operator when the palms of the operator are supported by said palm rests during operation of the keyboard, first and second keys in each of said first and second key arrays being constructed to move between first remote and second proximate positions remote from and proximate to the data input device, respectively, said first key being positioned so that its surface is vertically displaced from the surface of said second key when said first key is in said second proximate position and said second key is in said first remote position.

29. A method for data input, comprising:

providing a data input device having first and second laterally spaced apart alphanumeric key arrays and first and second laterally spaced apart function key arrays, said first and second function key arrays being substantially aligned with said first and second alphanumeric key arrays, said alphanumeric key arrays comprising home keys, said function key arrays having a plurality of function keys aligned in a substantially linear row, each having a keycap;

actuating said home keys by movement in a non-pivoting fashion in a first linear direction of actuation, said first linear direction of actuation defining a reference surface perpendicular thereto; and actuating said function keys by moving the surface of said functional keycaps in a direction different from said first linear direction.

30. A method as claimed in claim 29, wherein each of said keycaps is angled toward the user between about 15° and about 35°.

31. Data input apparatus for interfacing the fingers of the hand of an operator with a data processing device comprising:

a first key array having a plurality of key means constructed for manipulation of the fingers of the operator for providing input to the data processing device, said plurality of key means including home keys having surfaces that define a reference position for a hand of the operator, wherein the index finger of the operator defines a reference line when said hand of the operator is positioned in the reference position; and an auxiliary key array including a plurality of auxiliary key means constructed for manipulation by the thumb of said hand of the operator for providing input to the data processing device by depressing said auxiliary key means with no substantial lateral movement of said auxiliary key means, said auxiliary key means including at least first and second auxiliary keys which are elongated along first and second axes.

32. Apparatus, as claimed in claim 31, wherein said first elongated auxiliary key is a backspace key.

33. Apparatus, as claimed in claim 31, wherein said first elongated auxiliary key is an enter key.

34. Apparatus, as claimed in claim 31, wherein said second elongated auxiliary key is a space key.

35. A data input device for interfacing the hands of an operator with a data processing device comprising:

palm rest means for receiving the palms of the hands of the operator during operation of the data input device; and a key array including key means for providing input to the data processing device, said key means including first and second keys positioned to be aligned along the thumb of the operator, said first and second keys being constructed to move between first remote and second proximate positions remote from and proximate to the data input device, respectively, said first key being positioned so that its surface is vertically displaced from the surface of said second key when said first key is in said second proximate position and said second key is in said first remote position.

36. A keyboard for interfacing the fingers of an operator's hand with a data processing device, comprising:

an alphanumeric key array having a plurality of alphanumeric keys for identifying alphanumeric characters to the data processing device, said alphanumeric keys movable in a non-pivoting fashion in a linear direction of actuation, said alphanumeric keys including a home row having home keys wherein the home keys have keycaps, said home key keycaps defining a reference surface substantially perpendicular to the direction of activation of said home keys, said alphanumeric key array having an operator end and a distal end positioned on opposite sides of said reference surface wherein said operator end is proximate the operator when the keyboard is being used, a hand of the operator defining a reference position when the fingers of said hand of the operator are proximate the reference surface; and a function key array having a plurality of function keys for identifying functions to be performed by the data processing device, said plurality of function keys being distal said distal end of the alphanumeric key array, said function keys having function key keycaps, all of said function keys keycaps aligned in a substantially linear row and vertically displaced from said reference surface a distance of between about 3 cm and about 5 cm, all of said function key keycaps oriented at substantially the same angle, different from the orientation of the home key keycaps, and angled toward the hand of the operator.

37. Data input apparatus for interfacing the fingers of the hand of the operator with a data processing device comprising:

a key array having a plurality of keys, said plurality of keys including home keys having surfaces that define a reference surface, said home keys further defining a reference position for a hand of the operator wherein the index finger of the operator defines a reference line when said hand of the operator is positioned in the reference position;

an auxiliary key array including a plurality of auxiliary keys, activatable by depression with no substantial lateral movement of said auxiliary keys, said auxiliary keys being vertically displaced above the reference surface defined by said home keys and positioned so that the fingers of the operator extend downward from the thumb when the hand of the operator is in the reference position, said auxiliary keys including an elongated key positioned at an angle with respect to the reference line so that the thumb of the operator may be positioned along the surface of said elongate key; and palm rest means for receiving the palm of the operator generally coplanar with said auxiliary key means.

38. A method for data input, comprising:

providing a data input device having first and second palm rests and a key array with first and second keys constructed to move between first remote and second proximate positions remote from and proximate to the data input device, respectively;

supporting the hands of an operator with said lust and second pall rests; and moving said first key, with the thumb of the operator, to said second proximate position while contacting the second key with the thumb of the operator and maintaining said second key in said first remote position, said first key being vertically displaced above said second key.

* * * * *